(12) United States Patent
Kälvesten et al.

(10) Patent No.: US 12,420,801 B2
(45) Date of Patent: Sep. 23, 2025

(54) METHODS, APPARATUSES, SYSTEMS AND COMPUTER PROGRAM PRODUCTS FOR ESTIMATING ROAD CONDITION INFORMATION

(71) Applicant: NIRA Dynamics AB, Linköping (SE)

(72) Inventors: Johan Olof Kälvesten, Linköping (SE); Jesper Harald Otterholm, Linköping (SE); Per Olof Magnus Magnusson, Linköping (SE)

(73) Assignee: NIRA Dynamics AB, Linköping (SE)

( * ) Notice: Subject to any disclaimer, the term of this patent is extended or adjusted under 35 U.S.C. 154(b) by 379 days.

(21) Appl. No.: 17/779,775

(22) PCT Filed: Nov. 27, 2020

(86) PCT No.: PCT/EP2020/083676
§ 371 (c)(1),
(2) Date: May 25, 2022

(87) PCT Pub. No.: WO2021/105388
PCT Pub. Date: Jun. 3, 2021

(65) Prior Publication Data
US 2023/0010647 A1    Jan. 12, 2023

(30) Foreign Application Priority Data
Nov. 28, 2019  (DE) .......................... 102019132258.8

(51) Int. Cl.
*B60W 40/06* (2012.01)
*G08G 1/0967* (2006.01)

(52) U.S. Cl.
CPC ....... *B60W 40/06* (2013.01); *G08G 1/096708* (2013.01); *B60W 2555/20* (2020.02); *B60W 2556/45* (2020.02)

(58) Field of Classification Search
None
See application file for complete search history.

(56) References Cited

U.S. PATENT DOCUMENTS

| 6,173,231 B1* | 1/2001 | Chojnacki | B60Q 9/00 340/901 |
| 2014/0307247 A1* | 10/2014 | Zhu | B60W 40/064 342/54 |

(Continued)

FOREIGN PATENT DOCUMENTS

DE    102018202933 A1    8/2019

OTHER PUBLICATIONS

European Patent Office, PCT International Search Report and Written Opinion, Application No. PCT/EP2020/083676, dated Feb. 4, 2021, 13 pages.

*Primary Examiner* — Jason Holloway
(74) *Attorney, Agent, or Firm* — Mahamedi IP Law LLP

(57) ABSTRACT

Methods, apparatuses, systems and computer program products for estimating individualized road condition information for a specific vehicle are disclosed. Generic road condition information is received, which is indicative of at least one condition of a road segment. Further, individualization information is received, which is representative of an estimating method to be performed on the generic road condition information to obtain individualized road condition information for the specific vehicle. Individualized road condition information are estimated for the vehicle, wherein the estimating method is applied to the received generic road condition information to obtain individualized road condition information.

17 Claims, 5 Drawing Sheets

(56) References Cited

U.S. PATENT DOCUMENTS

| | | | |
|---|---|---|---|
| 2015/0166072 A1* | 6/2015 | Powers | B60W 40/076 |
| | | | 701/1 |
| 2017/0176196 A1* | 6/2017 | Powers | G01C 21/3602 |
| 2017/0357669 A1* | 12/2017 | Offenhaeuser | B60W 40/068 |
| 2018/0194286 A1* | 7/2018 | Stein | B60G 17/0165 |
| 2019/0001988 A1* | 1/2019 | Ienaga | G08G 1/096783 |
| 2019/0047575 A1 | 2/2019 | Lellmann et al. | |
| 2020/0271550 A1* | 8/2020 | Svantesson | G01N 19/02 |
| 2021/0048529 A1* | 2/2021 | Roy Chowdhury | G06V 20/56 |
| 2022/0073042 A1* | 3/2022 | Myklebust | B60T 8/172 |
| 2023/0032819 A1* | 2/2023 | Magnusson | G01W 1/02 |
| 2023/0245509 A1* | 8/2023 | Armstrong | G01C 21/3822 |
| | | | 701/41 |

* cited by examiner

METHODS, APPARATUSES, SYSTEMS AND COMPUTER PROGRAM PRODUCTS FOR ESTIMATING ROAD CONDITION INFORMATION

TECHNICAL FIELD

The present invention generally relates to estimating road condition information for a vehicle.

BACKGROUND OF THE INVENTION

In modern vehicles, a wide variety of information is measured or received, collected and processed for further use. For instance, dynamic or static information on road conditions (e.g. friction potential, presence of speedbumps etc.) may be collected by vehicle sensors and may be used to adapt vehicle behavior accordingly. For instance, in the case of a slippery road (low friction potential), the parameters for a potential ABS braking may be adapted accordingly.

With the rise of connected driving, this information is no longer restricted to an isolated vehicle: Instead, measured road condition information may be sent from vehicles to other vehicles, to (centralized or decentralized) infrastructure, such as an internet-based cloud system managing a road condition map, and vice versa.

With the exchange of road condition information, however, difficulties may arise in processing and understanding the data correctly: As an illustrative example, a vehicle with summer tires may experience a particular road segment as slippery and transmit the corresponding information to other vehicles—although these other vehicles may be equipped with winter tires and thereby not experience the road as (so) slippery. Conversely, considering a road condition map in the cloud has been built with data from vehicles with winter tires, the friction value communicated to a further vehicle may not be appropriate for that vehicle in case that vehicle is running on summer tires.

In other words: Differences in vehicle characteristics may lead to communication of road conditions, which significantly differ from the road conditions as actually experienced by or applicable for a specific vehicle. Such differences may lead to hampered safety, as illustrated by the above contrast between summer and winter tires, e.g. if a vehicle with summer tires assumes high friction on an actually snowy road.

As can be seen from these examples, a common problem in data processing of road condition information is the effect of the individual vehicle. Therefore, it is of great interest to provide individualized road condition information.

Therefore, it is an object of the present invention to provide enhanced solutions for an estimation of individualized road condition information for a vehicle.

SUMMARY OF THE INVENTION

Methods, apparatuses, systems and computer program products are disclosed, to overcome at least partially the shortcomings of the type mentioned above and others.

In a first aspect, a method of estimating individualized road condition information for a specific vehicle is disclosed.

The method comprises receiving generic road condition information, which is indicative of at least one condition of a road segment. For instance, the generic road condition information may be indicative of the condition for a "generic" vehicle. Non-limiting examples of the road condition information include one or more of the following: friction potential values, road weather condition information, road roughness information, pothole information, speedbump information.

The method further comprises receiving individualization information, which is representative of an estimating method to be performed on the generic road condition information to obtain individualized road condition information for the specific vehicle. Non-limiting examples of the individualization information comprise the following: a mathematical function, a set of one or more parameters, an algorithm, a program code, a neural network, a look-up table. For instance, an algorithm may deterministically lay down how to compensate for individual differences between the generic vehicle and the specific vehicle. Alternatively, a neural network may have been trained (using historical empirical data sets) to output individualized road condition data based on an input of generic road condition data and of individualization information. In the case of individualization information in the form of parameters, the parameters may describe the scaling behavior of the road condition in dependence of the difference between generic vehicle and specific vehicle.

The method further comprises estimating individualized road condition information for the vehicle, wherein the estimating method represented by the received individualization information is applied to the received generic road condition information to obtain individualized road condition information. This allows to compensate for any differences between the "generic" vehicle and the specific vehicle and thereby obtain a more appropriate estimate of the road conditions as experienced by the specific vehicle.

For instance, in some embodiments, the estimating method may be configured to take one or more individualization properties as input variable. In such cases, the method may further comprise inputting at least one of the individualization properties into the estimating method to obtain individualized road condition information as output in dependency of the input variables.

In particular, the individualization properties may comprise vehicle characteristics. Examples of vehicle characteristics include one or more of the following: number of wheels, number of wheels driven, number of steerable wheels, manufacturer, engine type, nominal power. This allows to compensate for static differences between vehicles, which lead to differences in the effect of road conditions on these various vehicles. For instance, a sports car may be more prone to changes in friction than a truck.

Additionally, or alternatively, the individualization properties may comprise detected vehicle sensor data. Examples of detected vehicle sensor data include one or more of the following: tire pressure, tire temperature, tire stiffness, wheel slip, ambient temperature, axle height, suspension pressure, suspension height, tire type (e.g. manually entered via a human-machine-interface; deduced from a tire classification algorithm or estimated based on other sensor signals), estimated friction potential (e.g. based on micro-slip, or from an ABS braking, or from a TCS event), normalized traction force on the wheel, friction related value, torque applied on the wheel, longitudinal acceleration, lateral acceleration, vertical acceleration, brake pressure, yaw rate, vehicle speed, wheel speed, steering wheel angle, wheel angle, wiper speed, ambient humidity, air pressure, rain sensor data, brightness, radar data, camera data, laser data. This allows to compensate for dynamic differences in ambient conditions, which may lead to differences in the effect of road conditions under the specific ambient conditions. For instance, a road condition such as friction potential typically shows a dependence on tire temperature.

In some embodiments, the method may further comprise (a) determining one or more individualization properties, which are indicative of the vehicle behavior of the vehicle, and (b) inputting the determined individualization properties as input variables to the estimating method to obtain the individualized road condition information. For instance, in the case of detected vehicle sensor data being part of the individualization properties, the determining of individualization properties may comprise making actual measurements using vehicle sensors. For instance, a tire temperature may be measured (directly or indirectly) using adequate sensors. Additionally, or alternatively, in the case of vehicle characteristics being part of the individualization properties, the determining of individualization properties may comprise retrieving this information from a vehicle-internal registry. For instance, the field comprising manufacturer information may be checked to determine the manufacturer.

In some embodiments, the method may further include (e.g. after the estimating of individualized road condition information) measuring individual road condition information at the vehicle on the particular road segment. The individual road condition information are indicative of the at least one condition of the road segment for the vehicle. In such cases, the method may further include transmitting the measured individual road condition information to a server. This allows to further build the road condition map and/or to better refine the individualization information.

Accordingly, in some embodiments, the method may further comprise comparing the measured individual road condition information with the estimated individualized road condition information. This comparing may occur at the vehicle or at the server. This allows to identify whether the individualization has provided a good estimate or not. In case the comparing shows good agreement, the individualization information may be considered reliable. In case the comparing shows reduced agreement, this allows to identify the source of the discrepancy, e.g. by statistics over a plurality of vehicles. For instance, a discrepancy may be due to a change in road conditions, such as a change in actual road friction due to recent snowfall. In such case, the generic road condition information may be updated. Alternatively, a discrepancy may be due to an over- or under-compensation in the individualization. For instance, the effect of tire temperature on friction may have been overestimated (or under-estimated). In such case, the individualization information may be updated.

These two types of deviation are identifiable by statistics: If essentially all vehicles signal a discrepancy (e.g. friction lower/higher than expected), then the generic road condition data may be updated. If only a subset of vehicles (e.g. all vehicles with low tire temperature) signal such discrepancy, the individualization information may be updated (for that subset of vehicles, i.e. for low tire temperature).

Thus, additionally, or alternatively, the method may further comprise updating the individualization information (or the estimating method) based on the measured individual road condition information. Again, the updating may occur at the vehicle or at the server. This allows to further refine the individualization properties and build a system which is capable of dynamic self-correction.

In some embodiments, the method may further comprise (a) transmitting the measured individual road condition information to a server, and (b) transmitting the outcome of the comparing and/or of the updating to a server. This allows for efficient management of generic road condition data.

In particular, the transmission of the outcome may occur separately from the transmission of the measured individual road condition information. This allows to reduce privacy concerns, by avoiding to transmit location data together with data allowing to identify a specific vehicle.

In some embodiments, the method may further comprise outputting the individualized road condition information. The individualized road condition information may be outputted to an autonomous driving system, a vehicle control system, and/or a driver assistance system, of the vehicle. This allows to adapt the driving behavior of the vehicle in accordance with the individualized road condition information and thereby increase safety.

In some embodiments, the method may further comprise (a) generating generic road condition information and generating individualization information, and (b) transmitting the generated generic road condition information and generated individualization information, from a server to the vehicle. This allows for a decentralized individualization at the vehicle.

In a second aspect, a computer program product is provided, which includes program code configured to, when executed in a computing device, to carry out the steps of a method according to the first aspect.

In a third aspect, an apparatus for estimating individualized road condition information for a specific vehicle is provided. The apparatus comprises a communication interface and a processing unit. The communication interface is for receiving generic road condition information and for receiving individualization information. The generic road condition information is indicative of at least one condition of a road segment, e.g. for a "generic" vehicle. The individualization information is representative of an estimating method to be performed on the generic road condition information to obtain individualized road condition information for the specific vehicle.

The processing unit is communicatively coupled with the communication interface and configured to estimate individualized road condition information for the vehicle, wherein the estimating method (represented by the received individualization information) is applied to the received generic road condition information to obtain individualized road condition information.

In some embodiments of the apparatus, the processing unit is further configured to carry out the method steps of a method according to the first aspect.

In a fourth aspect, a system for estimating individualized road condition information for a vehicle is provided. The system comprises an apparatus according the third aspect and further comprises at least one of a sensor, a bus interface and/or a server.

The sensor may be for estimating one or more individualization properties, in particular of vehicle sensor data. This allows for taking into account dynamic changes in ambient conditions and thereby a more complete picture of the individualization.

The bus interface may be configured to output the individualized road condition information to a vehicle bus of the vehicle. This allows for efficiently making use of the obtained data and for a seamless integration of the teaching according to the present disclosure into existing vehicle systems.

The server may be configured to generate the generic road condition information and to transmit it to the vehicle, and configured to generate the individualization information and to transmit it to the vehicle.

Further, the system may comprise storage means, configured to store the generic road condition information and/or the individualization information.

In a fifth aspect, use of a system according to the fourth aspect is provided, for estimating individualized road condition information for a vehicle.

In a further aspect, the present disclosure also relates to methods, systems and computer program products for building a map of road conditions. To this end, individual road condition information is received. The individual road condition information is indicative of a road condition as perceived by a specific vehicle. Further, one or more individualization properties are received for that vehicle. Based on the received individual road condition information and the individualization properties, generic road condition data may be estimated, indicative of the road condition for a (hypothetical) generic vehicle. This allows to reduce the effect of the vehicle-specific errors. In other words, the process compensates for the vehicle-specific portion of the measurement of road condition (i.e. carries out the individualization "in reverse", i.e. a generalization). This compensation may be carried out at the vehicle or at a server. Based on generic road condition data from a plurality of vehicles, a map of generic road condition data may be constructed.

In case the compensation is carried out at the server, the transmission of road condition information from each of the plurality of vehicles may occur separately from the transmission of individualization properties. This allows to reduce privacy concerns in case a specific vehicle were to be identifiable by its individualization information and the individual road condition information were to include location information.

SHORT DESCRIPTION OF THE DRAWINGS

The following detailed description refers to the appended drawings, wherein:

FIG. 1 schematically illustrates a situation with roads and vehicles, in which situation methods, apparatuses or systems according to embodiments may be used.

Figure 4:
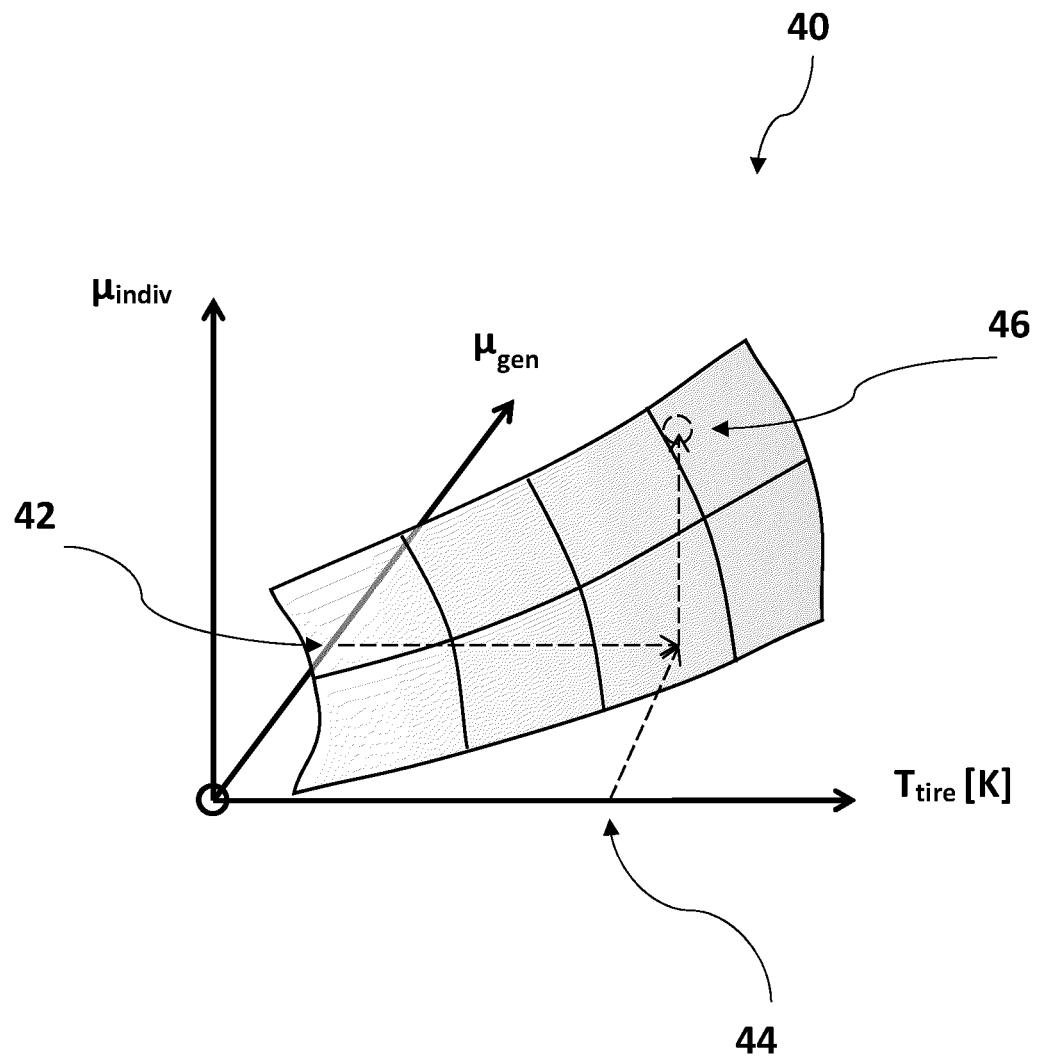

FIG. 4 schematically illustrates a graph representing individualization information according to an embodiment.

Figure 5:
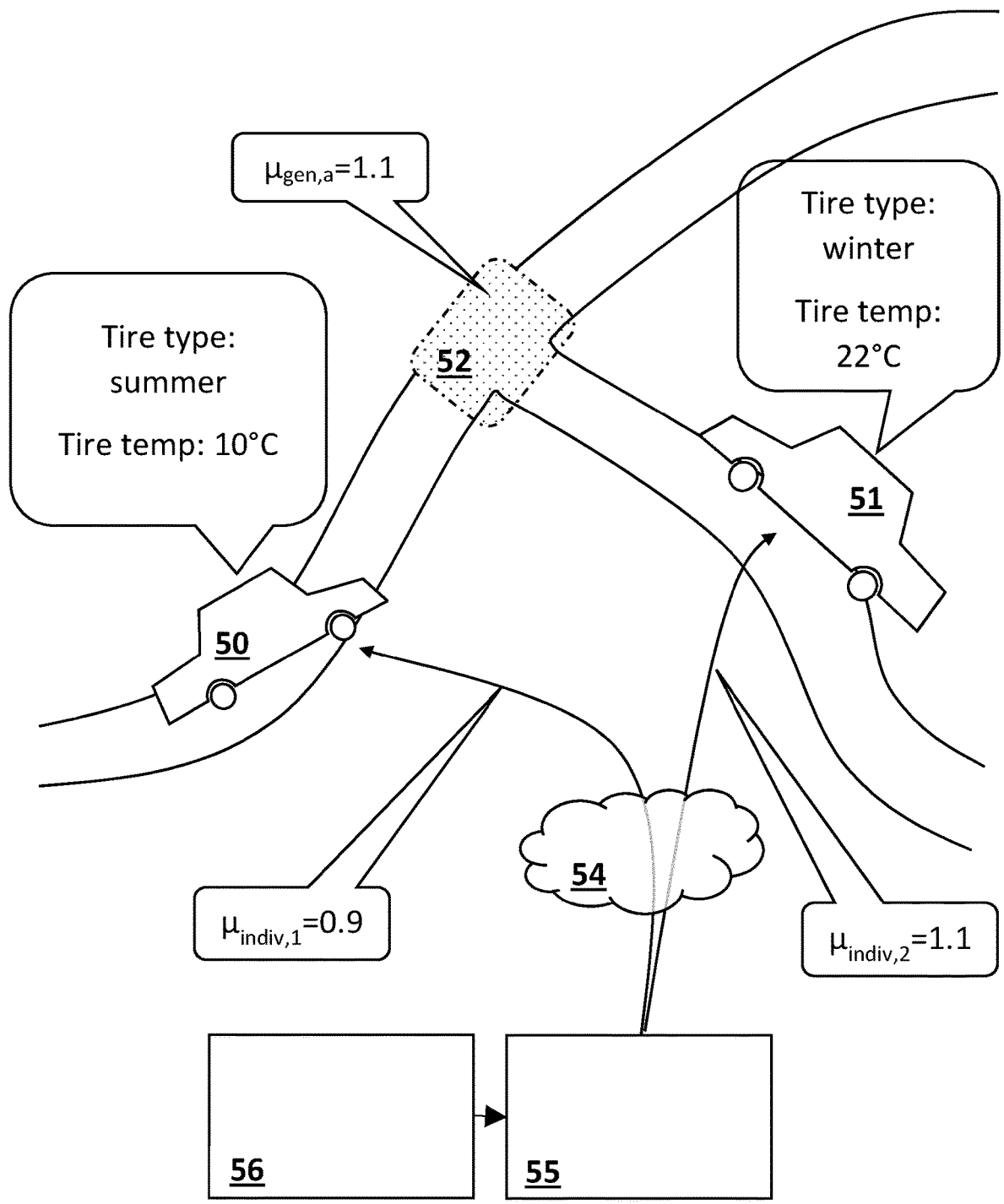

FIG. 5 schematically illustrates use of an apparatus according to embodiments.

DETAILED DESCRIPTION OF EMBODIMENTS

Figure 1:
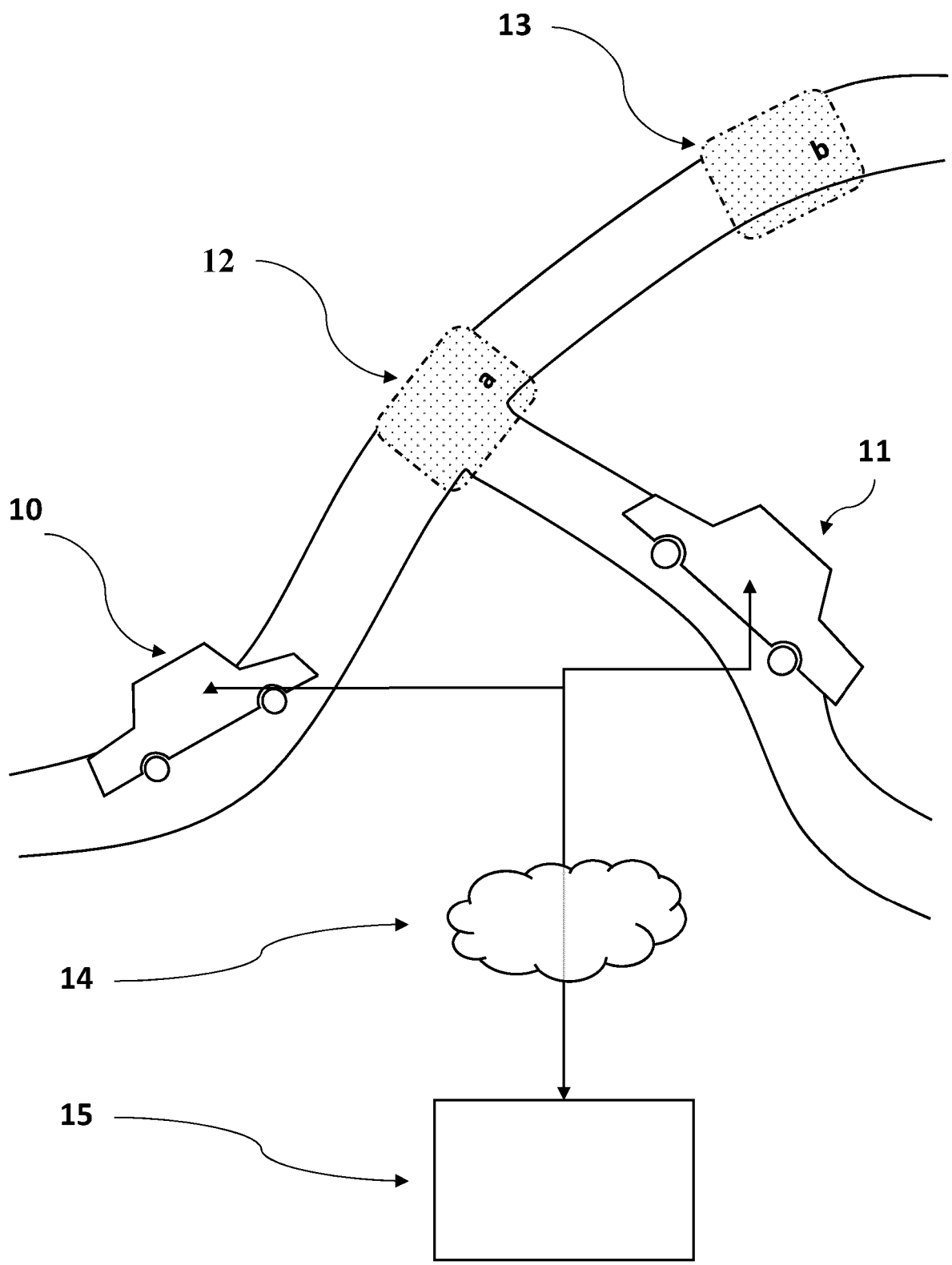

FIG. 1 schematically illustrates a situation with roads and vehicles, in which situation methods, apparatuses or systems according to embodiments may be used.

A first vehicle 10 and a second vehicle 11 are travelling on roads. In particular, both vehicles 10, 11 are approaching a first road segment 12 at a location a. Subsequently, they will approach a second road segment 13 at a location b.

Both vehicles are in communication with an apparatus 15 according to the present disclosure. In particular, in the example shown, the apparatus 15 is a central server, which is linked with both vehicles 10, 11 via a wireless communication link via the internet 14.

Generally, the teaching of the present disclosure may be implemented at various points of such a system. In the example shown, the apparatus 15 is centrally located, at a location remote to the vehicles and roads. With reference to the Figures, the teaching is exemplarily illustrated with a focus on such central implementation. In other examples, the functionality of a server may be implemented in decentralized cloud infrastructure.

In other embodiments, the apparatus 15 may be located at a vehicle, such as vehicle 10. In such cases, the vehicles 10, 11 are may be linked directly by virtue of a car-to-car communications link. In still further embodiments, some functionality of the teaching may be implemented at a server, whereas some functionality may be implemented at the vehicle(s).

Returning to FIG. 1, the apparatus 15 is configured to provide individualized road condition information for each vehicle 10, 11.

For instance, the apparatus may be configured to provide individualized friction potential estimates for each vehicle 10, 11. Estimated friction potential is a measure for the slipperiness of a particular road segment, such as first road segment 12.

To this end, the apparatus 15 makes use of generic road condition information and of individualization information. In the example shown, the generic road condition information may be generic friction potential data for the first road segment 12. Such generic friction potential data may be based on a statistic processing of friction data collected by previously passing vehicles on the first road segment. Additionally, or alternatively, the generic friction potential data may be based on meteorological models, configured to estimate local road conditions. In this sense, the generic friction potential data may be thought of as being indicative of the condition for a "generic" vehicle—irrespective of whether such generic vehicle physically exists or not.

In the example of a statistical data collection, the generic vehicle may for instance be thought of as the statistical mean of the previously passing vehicles. Alternatively, the generic vehicle may have defined characteristics. For example, it may be defined as (inter alia) having winter tires and having a certain tire temperature (e.g. 20° C.). In such a case, the statistical processing of empirical data from previously passing vehicles may comprise adjusting the actually measured values of the previously passing vehicles to compensate for differences to the assumed generic vehicle (such as compensating for the presence of summer tires and/or any difference in tire temperature). For illustration purposes, in the case of FIG. 1, the generic vehicle may be thought of as having winter tires at a tire temperature of 20° C.

In any case, the generic friction potential data is indicative of at least one condition (e.g. slipperiness as indicated by friction potential) of the first road segment 12, for a generic vehicle. However, the generic friction potential data may not be a good estimate for the individual vehicle, such as first vehicle 10. For instance, first vehicle 10 may be travelling with summer tires at a tire temperature of 10° C. and thereby differ significantly from the generic vehicle. The presently disclosed teaching provides for solutions to individualize the road friction data for first vehicle 10, such that the individualized road friction data may be used by first vehicle 10 and provide a more appropriate estimate than the "generic" data.

At the same time, the generic friction potential data may be a somewhat more appropriate estimate for the second vehicle 11, which may be travelling with winter tires at a tire temperature of 22° C. and thus be relatively similar to the assumed generic vehicle. In this case, the individualization of generic friction potential data may involve smaller compensations, e.g. only for a small difference in tire temperature.

For illustration purposes, friction potential is taken as an example. However, the description of the condition of first road segment 12 may comprise other or further information, such as information about the current weather, information about road roughness, information about potholes or speedbumps, etc.

As mentioned above, the apparatus 15 also makes use of individualization information, in addition to the generic road condition information. The individualization information is representative of an estimating method to be performed on the generic road condition information to obtain individualized road condition information for the specific vehicle, as will be described in further detail with reference to the following figures. The individualization information may describe the dependency of the road condition on vehicle properties or vehicle sensor data. For instance, it may describe how friction potential scales with tire temperature and/or how it depends on tire type.

Based on the individualization information and the generic friction potential data, the apparatus 15 estimates individualized friction potential data for the first vehicle 10 for the first road segment 12. In this process, the estimating method represented by the received individualization information is applied to the received generic road condition information (generic friction potential data) to obtain individualized road condition information (individualized friction potential data).

The individualized friction potential data may then be transmitted to that specific vehicle, e.g. first vehicle 10. The vehicle may make use of this individualized information upon approaching the first road segment 12, e.g. to adapt a vehicle control system accordingly. As an illustrative example, the individualized friction potential data may be forwarded via a vehicle bus interface to an ABS braking module in order to adjust the ABS braking parameters in view of the individualized friction potential data. The individualized friction data may also be used advantageously in an autonomous driving situation.

The above-described process may then be repeated for another road segment, e.g. second road segment 13 at a second location b.

In other examples, not shown, the individualization may also occur at the vehicle. For instance, both the individualization information and the generic road condition information may be transmitted from the server to the respective vehicle.

Figure 2:
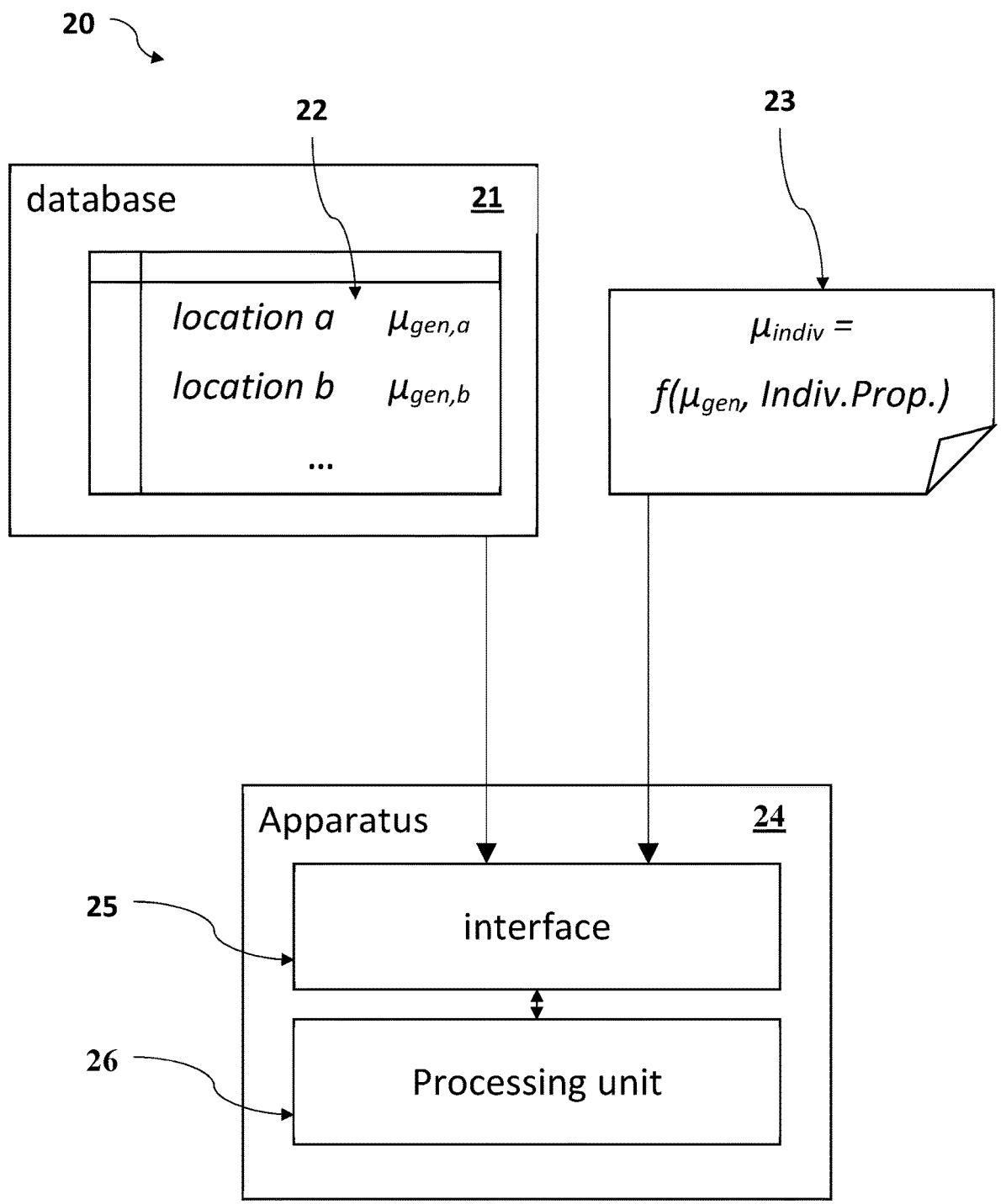
FIG. 2 illustrates a box diagram of a system with an apparatus according to an embodiment.

FIG. 2 illustrates a box diagram of a system 20 with an apparatus 24. In particular, apparatus 24 may be an implementation of the apparatus 15 shown schematically in FIG. 1.

The system 20 comprises a database 21, holding generic road condition data. In the example shown, the database comprises a number of database entries 22, which link generic friction potential values to corresponding location data. For instance, the database 21 holds a first entry, which indicates a first generic friction potential $\mu_{gen,a}$ for the first road segment at location a of FIG. 1. Further, the database 21 holds second entry, which indicates a second generic friction potential $\mu_{gen,b}$ for the second road segment at location b. The database 21 may thus be visualized as a map of generic road condition data, which holds a generic friction value for each (or at least some) locations.

Further, the system 20 comprises individualization information 23. The individualization information 23 is representative of an estimating method to be performed on the generic road condition information to obtain individualized road condition information for a specific vehicle. In the example shown, the individualization information is represented by a mathematical function, which expresses individual friction potential $\mu_{indiv}$ as a function of generic friction data $\mu_{gen}$ and as a function of a set of individualization properties, as will be detailed further below with reference to FIG. 4. As mentioned above, an illustrative example of a set of individualization properties may comprise tire type (e.g. summer or winter tires) and tire temperature.

Other examples of individualization information, not shown, comprise set of one or more parameters, an algorithm, a program code, a neural network, a look-up table. In any case, the individualization information allows to estimate individualized road condition information based on generic road condition information.

For instance, both the individualization information 23 and the database 21 with entries 22 on generic road condition data may be stored on a storage means (not shown) of system 20.

Further, the system 20 comprises apparatus 24 for estimating the individualized road condition information for a specific vehicle. The apparatus 24 comprises a communication interface 25 and a processing unit 26. The communication interface 25 is for receiving generic road condition information from database 21 and for receiving the individualization information 23. The reception of generic road condition information comprises at least the generic road condition information (e.g. generic road condition data at location a, $\mu_{gen,a}$). Optionally, it may further comprise receiving the corresponding location data (e.g. location a). In the latter case, the communication interface 25 receives one of the database entries 22 of database 21. In still further examples, the receiving may relate to the entire database or at least portions thereof.

The processing unit 26 is communicatively coupled with the communication interface 25 and configured to estimate individualized road condition information for the vehicle, wherein the estimating method (represented by the received individualization information) is applied to the received generic road condition information to obtain individualized road condition information.

Figure 3:
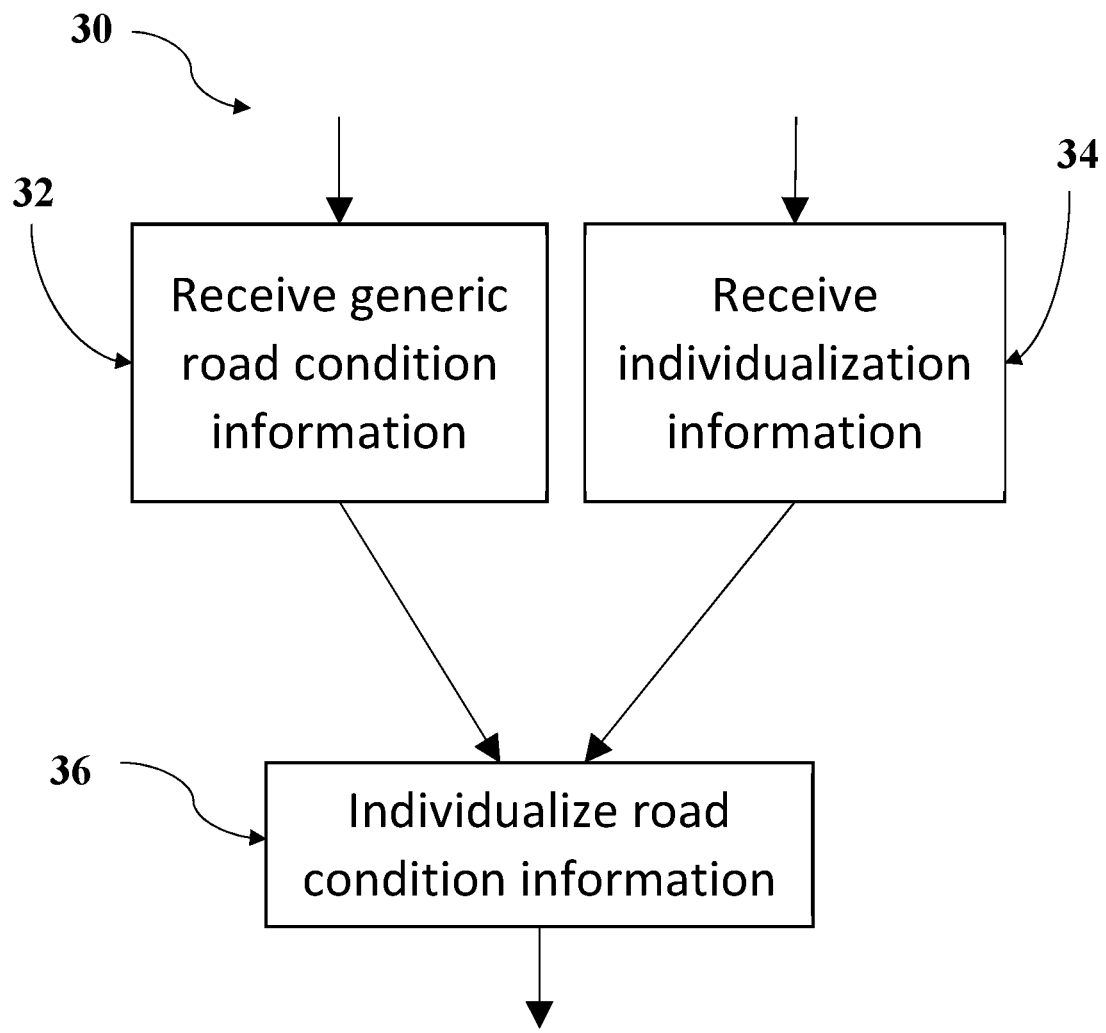
FIG. 3 illustrates a flow diagram of a method according to embodiments.

FIG. 3 illustrates a flow diagram of an embodiment of a method 30 for estimating individualized road condition information for a specific vehicle.

The method 30 comprises receiving 32 generic road condition information. The generic road condition information is indicative of at least one condition of a road segment. As mentioned above, examples of generic road condition information include one or more of the following: friction potential values, road weather condition information, road roughness information, pothole information, speedbump information.

The method 30 further comprises receiving 34 individualization information. The individualization information is representative of an estimating method to be performed on the generic road condition information to obtain individualized road condition information for the specific vehicle. Non-limiting examples of the individualization information comprise the following: a mathematical function, a set of one or more parameters, an algorithm, a program code, a neural network, a look-up table.

The method 30 further comprises estimating 36 individualized road condition information for the vehicle. To this end, the estimating method represented by the received individualization information is applied to the received generic road condition information to obtain individualized road condition information.

FIG. 4 schematically illustrates a graph 40 representing individualization information according to an embodiment. The individualization information is representative of an estimating method to be performed on the generic road condition information to obtain individualized road condition information. The graph is the visual representation of a relationship, which expresses individual friction potential $\mu_{indiv}$ as a function of generic friction data $\mu_{gen}$ and as a function of tire temperature as an exemplary individualization property.

For any given generic friction value 42 and given tire temperature 44, the graph 40 yields the corresponding individualized friction potential 46.

The individualization information may be given as a numerical relationship (shaded surface in graph 40), as depicted in FIG. 4. In other examples, the relationship may be expressed mathematically by parameters, such as a function definition in the shape of $\mu_{ind}=A*(T_{tire}-B)*\mu_{gen}$, wherein A and B represent tuning parameters, e.g. B representing the (assumed) tire temperature of a (hypothetical) generic vehicle, and A representing a scaling parameter of the tire temperature dependence of friction potentials.

In this respect, individualization information represented by graph 40 is similar to the individualization information 23 described above with reference to FIG. 2.

In other embodiments, not shown in FIG. 4, the mathematical function may take more than one individualization property as input variable (e.g. a set of individualization properties). However, for illustration purposes, a three-dimensional representation as graph 40 is possible for one input variable.

Further, the graph 40 is shown for the example of continuous distributions or spectra of input variables (tire temperature and friction potential may take any value from an interval). However, in other examples, the input and/or output variables may be discrete.

For instance, in other embodiments, not shown in FIG. 4, the mathematical function may take tire type (e.g. summer or winter tire) as a further input variable. In the case of a summer tire, an additional (negative) offset may be added in the estimation of the individualized friction potential (assuming that the generic friction potential has been determined for winter tires).

FIG. 5 schematically illustrates use of an apparatus 55 in a situation similar to the situation sketched in FIG. 1. A first vehicle 50 and a second vehicle 51 are approaching a first road segment 52.

The system has a generic friction potential at first road segment 52 with a value of 1.1. However, this estimate is only valid for a "generic" vehicle with winter tires at a tire temperature of 20° C., whereas the first vehicle 50 is travelling with summer tires at a tire temperature of 10° C. The second vehicle 51 is travelling with winter tires at a tire temperature of 22° C.

To compensate for these differences between the generic vehicle and the actual properties of the first and second vehicles 50, 51, the teaching described above with reference to FIGS. 2-4 may be applied:

The apparatus 55 is communicatively coupled to storage means 56 comprising a database with entries on generic friction data, similar to the arrangement of FIG. 2. The storage means 56 further comprises the individualization information, e.g. mathematical function 23 of FIG. 2 or a graph in accordance with FIG. 4.

The apparatus 55 receives the generic friction data and the individualization information to estimate individualized friction data, similar to the method described with reference to FIG. 3.

The individualized friction data may then be transmitted from the apparatus 55 to the respective vehicle. For instance, apparatus 55 may transmit an individualized friction estimate having a value of 0.9 to first vehicle 50 for location 52. Further, apparatus 55 may transmit an individualized friction estimate having a value of 1.1 to second vehicle 51 for location 52.

In the example shown, the apparatus 55 is located at a location remote to the vehicles and roads. In line therewith, the apparatus 55 may be implemented as a server or a cloud infrastructure. In other examples, not shown, the apparatus 55 may be located at a vehicle, such as first vehicle 50. In such cases, the storage means 56 transmits the generic friction data and the individualization information to the vehicles, such as first vehicle 50. At first vehicle 50, apparatus 55 is then capable of generating the individualized friction estimate locally, e.g. as having a value of 0.9 in the example of first vehicle 50.

Returning to the central arrangement of FIG. 5, once one of the vehicles (e.g. first vehicle 50) reaches the road segment 52, the (actual) individual road condition information may be measured at that vehicle. For instance, the actual friction potential may be measured in the course of an ABS event or may be estimated by processing other sensor data, such as a wheel speed sensor of vehicle 50. The individual road condition information are then indicative of the condition of the road segment as perceived by the vehicle 50.

These measured individual road condition information (not shown in FIG. 5) may then be transmitted to apparatus 55 and be compared (at the apparatus 55, irrespective of whether the apparatus 55 is located centrally or at a vehicle) with the previously estimated individualized road condition information. The outcome of this comparison allows to update the individualization information. In particular, the presently disclosed teaching allows to transmit the outcome of this comparison separately from the transmission of the measured individual road condition information or separately from any privacy-sensitive data such as location information or information allowing to identify a particular vehicle. In short, the discrepancy between the estimate and the actual measurement allows to update the individualization information based on the measured individual road condition information:

For instance, first vehicle 50 may show a discrepancy between the estimate and the actual measurement whereas second vehicle 51 may indicate good agreement. Thus, the comparison may reveal that the tire temperature effect on individualized friction data had been overestimated (in case the actual individual road condition information of the first vehicle deviates from the estimated individualized road condition information and is in fact closer to the generic road condition information) or underestimated (in case the actual individual road condition information deviates from the estimated individualized road condition information and is in fact further away from the generic road condition information). As a result, the temperature dependence in the individualization information may be adjusted, e.g. by changing the corresponding tuning parameters, which is representative of the temperature dependence. This adjustment of individualization parameters may be particularly advantageous by taking into account statistical analysis from a plurality of vehicles.

The invention claimed is:

1. A method of estimating individualized road condition information for a specific vehicle, the method comprising
receiving generic road condition information, which is indicative of at least one condition of a road segment;
receiving individualization information, which is representative of an estimating method to be performed on the generic road condition information to obtain individualized road condition information for the specific vehicle;
estimating individualized road condition information for the vehicle and the road segment, wherein the estimating method is applied to the received generic road condition information to obtain individualized road condition information; and
wherein the method further comprises, after the estimating:
measuring, at the vehicle using a vehicle sensor, individual road condition information indicative of the at least one condition of the road segment for the vehicle;
comparing the measured individual road condition information with the estimated individualized road condition information;
updating the individualization information based on the comparison; and
outputting the individualized road condition information to a vehicle control system of the vehicle.

2. The method of claim 1, wherein
the estimating method is configured to take one or more individualization properties as input variable, and
the method further comprises inputting at least one of the individualization properties into the estimating method to obtain individualized road condition information as output in dependency of the input variables.

3. The method of claim 2, wherein the individualization properties comprise vehicle characteristics, including one or more of a number of wheels, a number of wheels driven, a number of steerable wheels, a manufacturer, an engine type, and/or a nominal power.

4. The method of claim 2, wherein the individualization properties comprise detected vehicle sensor data, including one or more of: a tire pressure, a tire temperature, a tire stiffness, a wheel slip, an ambient temperature, an axle height, a suspension pressure, a suspension height, a tire type, an estimated friction potential, a normalized traction force on the wheel, a friction related value, a torque applied on the wheel, a longitudinal acceleration, a lateral acceleration, a vertical acceleration, a brake pressure, a yaw rate, a vehicle speed, a wheel speed, a steering wheel angle, a wheel angle, a wiper speed, an ambient humidity, an air pressure, a rain sensor data, a brightness, a radar data, a camera data, and/or laser data.

5. The method of claim 1, further comprising:
determining one or more individualization properties, which are indicative of a vehicle behavior of the vehicle; and
inputting the determined individualization properties as input variable to the estimating method to obtain the individualized road condition information.

6. The method of claim 1, further comprising:
transmitting the measured individual road condition information to a server.

7. The method of claim 6, further comprising:
transmitting the outcome of the comparing and/or of the updating to the server.

8. The method of claim 7, wherein the transmission of the outcome occurs separately from the transmission of the measured individual road condition information.

9. The method of claim 1, wherein
the road condition information includes one or more of the following: friction potential values, road weather condition information, road roughness information, pothole information, and speedbump information; or
the individualization information comprises at least one of the following: a mathematical function, a set of one or more parameters, an algorithm, a program code, a neural network, and a look-up table.

10. The method of claim 1, further comprising:
outputting the individualized road condition information to an autonomous driving system and/or a driver assistance system, of the vehicle.

11. The method of claim 1, further comprising, before the receiving:
generating generic road condition information and generating individualization information; and
transmitting the generated generic road condition information and generated individualization information, from a server to the vehicle.

12. A non-transitory computer readable medium that stores a computer program product including program code configured to, when executed in a computing device, to carry out the steps of:
receiving generic road condition information, which is indicative of at least one condition of a road segment;
receiving individualization information, which is representative of an estimating method to be performed on the generic road condition information to obtain individualized road condition information for a specific vehicle;
estimating individualized road condition information for the specific vehicle and the road segment, wherein the estimating method is applied to the received generic road condition information to obtain individualized road condition information;
measuring, using a vehicle sensor at the vehicle, individual road condition information indicative of the at least one condition of the road segment for the vehicle;
comparing the measured individual road condition information with the estimated individualized road condition information;
updating the individualization information based on the comparison; and
outputting the individualized road condition information to a vehicle control system of the vehicle.

13. A system for estimating individualized road condition information for a specific vehicle, comprising:
a processing unit configured to:
receive generic road condition information, which is indicative of at least one condition of a road segment;
receive individualization information, which is representative of an estimating method to be performed on the generic road condition information to obtain individualized road condition information for the specific vehicle; and
estimate individualized road condition information for the vehicle and the road segment, wherein the estimating method is applied to the received generic road condition information to obtain individualized road condition information, wherein the processing unit is further configured to:
measure, using a vehicle sensor at the vehicle, individual road condition information indicative of the at least one condition of the road segment for the vehicle;
compare the measured individual road condition information with the estimated individualized road condition information;
update the individualization information based on the comparison; and
output the individualized road condition information to a vehicle control system of the vehicle.

14. The system of claim 13, wherein the estimating method is configured to take one or more individualization properties as input variable, and wherein the processing unit is further configured to carry out inputting at least one of the individualization properties into the estimating method to obtain individualized road condition information as output in dependency of the input variables.

15. The system of claim 13, further comprising:
a sensor for estimating one or more individualization properties.

16. The system of claim 13, further comprising:
a bus interface configured to output the individualized road condition information to a vehicle bus of the vehicle.

17. The system of claim 13, further comprising:
a server, the server being configured to generate the generic road condition information and to transmit it to the vehicle, and the server being configured to generate the individualization information and to transmit it to the vehicle.

* * * * *